May 5, 1970 R. W. STOFFEL 3,510,085
EMERGENCY LOCKING RETRACTOR WITH DISABLING MEANS
Filed July 31, 1967 6 Sheets-Sheet 1
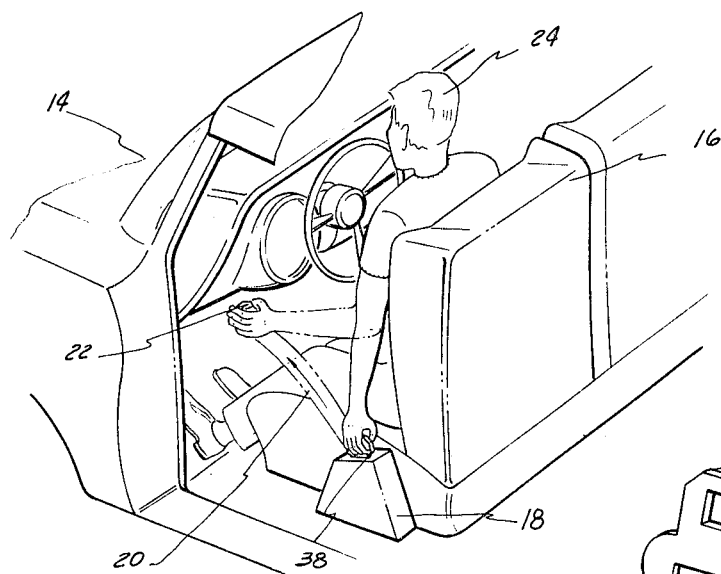
FIG.1
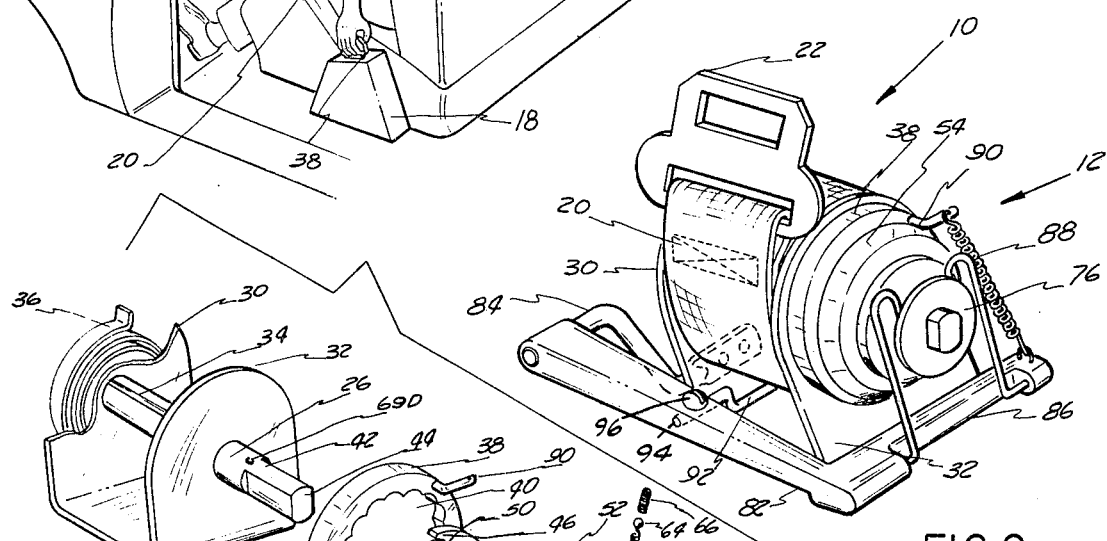
FIG.2
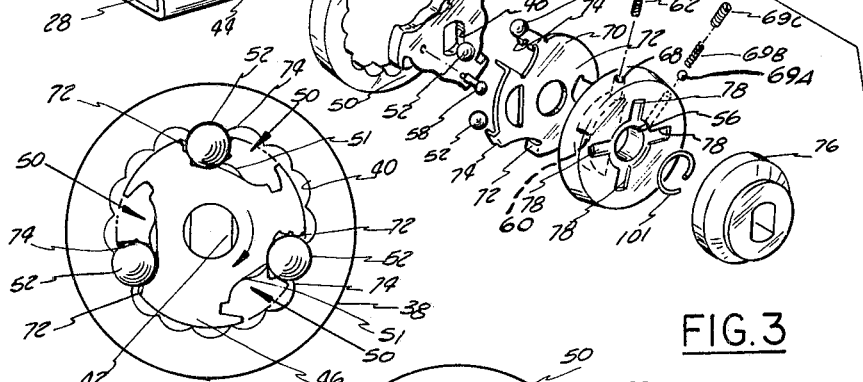
FIG.3
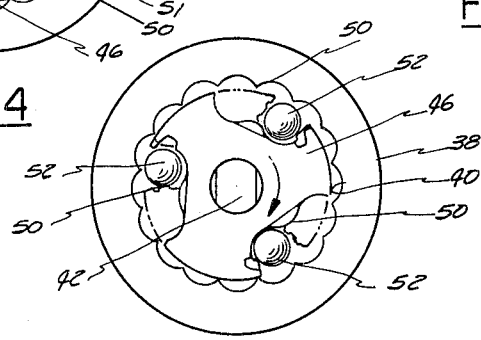
FIG.4
FIG.5
INVENTOR.
ROBERT W. STOFFEL
BY
*Hauke, Krass, & Sifford*
ATTORNEYS.

May 5, 1970 R. W. STOFFEL 3,510,085
EMERGENCY LOCKING RETRACTOR WITH DISABLING MEANS
Filed July 31, 1967 6 Sheets-Sheet 3

INVENTOR.
ROBERT W. STOFFEL
BY
Hauke, Krass, & Gifford
ATTORNEYS

May 5, 1970          R. W. STOFFEL          3,510,085

EMERGENCY LOCKING RETRACTOR WITH DISABLING MEANS

Filed July 31, 1967          6 Sheets-Sheet 5

INVENTOR.
ROBERT W. STOFFEL
BY
ATTORNEYS

May 5, 1970     R. W. STOFFEL     3,510,085

EMERGENCY LOCKING RETRACTOR WITH DISABLING MEANS

Filed July 31, 1967     6 Sheets-Sheet 6

INVENTOR.
ROBERT W. STOFFEL
BY
ATTORNEYS 3,510,085
EMERGENCY LOCKING RETRACTOR WITH
DISABLING MEANS
Robert W. Stoffel, Ferndale, Mich., assignor to Jim
Robbins Seat Belt Company, Royal Oak, Mich.
Filed July 31, 1967, Ser. No. 657,166
Int. Cl. B65h 75/48
U.S. Cl. 242—107.4                                 25 Claims

ABSTRACT OF THE DISCLOSURE

An inertial locking safety seat belt retractor with various mechanisms for disabling the retractor locking means until a minimum length of the belt has been withdrawn from the retractor.

Two embodiments of the disabling means are responsive to the changing diameter of the belt roll wound on the reel. Other embodiments are coupled to the rotating wind up reel and are actuated when the reel rotates a predetermined number of revolutions after the initial extension of the belt.

BACKGROUND OF THE INVENTION

Field of the invention

This invention relates to automatic locking retractors for safety seat belts and more specifically to an automatic locking retractor of the emergency locking type having locking means that are normally activated after the body restrained by the belt is acted upon by sudden forces tending to displace the body from a normal position within the vehicle and including disabling means for rendering the locking means inoperative until a predetermined amount of belt has been withdrawn from the retractor.

Description of the prior art

Automatic locking retractors for vehicle safety seat belts of the type permitting the occupant of the seat belt system to perform normal movements relative to a seated position by freely extending and retracting the belt, but which have locking means which respond to an emergency or abnormal condition to lock the retractor reel against rotation so that the belt is capable of applying restraining forces are known as emergency locking retractors. The locking mechanism of retractors of this character are activated by some form of motion produced by the abnormal occurrence. This motion may be reflected in a change in the vehicle acceleration or deceleration, abnormal webbing movement relative to the vehicle or an abnormal reel rotation. Thus the locking means of such retractors may be characterized as being motion responsive.

The problem with emergency locking retractors is that they must be extremely sensitive to the triggering movement such as belt movement and respond in a fraction of a second to lock the belt against further movement so that restraining forces can be immediately applied by the belt to the occupant. Because of this sensitivity factor, such retractors have a tendency to "prelock" under the influence of an exciting force produced under normal conditions. For instance, when the belt is fully retracted and the occupant commences to withdraw the end of the belt toward his lap, the withdrawing motion is often sufficient to cause the retractor to prelock which is annoying as the occupant tends to embrace himself in the seat belt and results in reluctance to employ the seat belt as a restraining device.

The broad purpose of the present invention is to provide means for disabling the locking mechanism of emergency locking retractors so that it is relatively insensitive to belt movement until the belt has been withdrawn from its stored position a predetermined length such as eighteen inches to permit the occupant to couple himself to the belt. The problem solved by the preferred embodiments of the invention is to be distinguished from those type of automatic locking retractors having means rendering the locking device inoperative until the occupant has withdrawn a sufficient length of the belt to form a lap restraint at which time the locking means lock the belt against further extension. The present invention permits the occupant to continue to extend and retract the belt after the two buckle sections have been coupled together with the locking mechanism remaining in an unlocked condition until an emergency situation arises.

SUMMARY

The preferred embodiment of the present invention, which will be subsequently described in greater detail, is described with reference to an inertia actuated retractor having a reel supported for rotation between wind and unwind directions, and a belt mounted on the reel with spring means biasing the reel in the wind direction to absorb any slack in the belt but being yieldable to a pull out force applied by the occupant on the belt. An inertia wheel rotatably mounted on the reel is yieldably coupled to the reel and normally rotates in unison with the reel as the wheel rotates in the unwind direction. When the reel rotates at an abnormal rate, the yieldable coupling means permit the inertia member to rotate relative to the reel under the influence of the mass of the inertia member so that locking means, responsive to the relative rotation of the inertia member, lock the reel against further rotation in the unwind direction.

For purposes of description, the preferred embodiment illustrating the invention disable the locking means by preventing the inertia member from rotating relative to the reel until a predetermined amount of belt has been withdrawn from the reel such as eighteen inches. Means are provided for adjusting this predetermined amount. A disabling or locking member is keyed to the reel adjacent the inertia member so that it rotates at all times with the reel but is axially displaceable toward a first position where it engages the inertia member with abutments which prevent the inertia member from rotating relative to the reel. In a second, disengaged position, the locking member is spaced from the inertia member so that the inertia member is free to respond to the rotational acceleration of the reel.

The preferred disabling means employs a pivotal arm which is movable between raised and lowered positions adjacent the reel. The outer end of the arm has a wire member bent into the shape of a collar which engages the locking member such that when the arm is raised, the locking member is displaced away from the inertia wheel and when the arm is lowered the locking member is displaced toward engagement with the inertia wheel.

The arm is biased upwardly by a spring bias member. A belt sensing finger carried by the arm engages the lower side of the belt roll wound on the reel so that the arm is lowered as the belt diameter increases and is raised as the belt diameter decreases. Thus by adjusting the attitude of the belt sensing finger with respect to the arm, the locking member can be adjusted to engage the inertia wheel when any selected amount of belt has been unwound from the reel.

The preferred embodiment has an additional advantage in that by mounting the disabling means on the underside of the retractor, an occurrence which renders the disabling means inoperative such as a separation or failure of the spring bias member will leave the retracting device in an operable condition so that the belt will apply a restraining force on the occupant in the event of an abnormal occurrence. This "fail safe" feature of the preferred embodiment provides the advantage of obviating the "prelocks," however, it cannot render the inertia actuated locking means inoperative in an emergency situation.

Another embodiment of the invention which is also responsive to the effective diameter of the belt roll includes a hinged actuating member engaged with the locking member and movable between positions which displace the locking member toward and away from the inertia wheel. An elongated flexible cable having one end fixed to the hinge member has its belt-sensing opposite end riding on the belt roll. The belt-sensing end of the cable is supported for radial movement toward and away from the reel axis and is arranged so as the diameter of the belt increases and decreases, the hinged member axially displaces the locking member between engaged and disengaged positions with the inertia wheel. Thus the cable provides a relatively simple means for transforming a radial movement into an axial motion with the added advantage that the belt-sensing end of the cable can be mounted in any of a variety of positions around the retractor.

Another preferred disabling means responds to the reel being rotated about its axis a selected number of revolutions from a reference position as opposed to detecting the effective belt diameter. This form of the invention employs a nut mounted on a threaded end of the reel. As the reel rotates between wind and unwind directions, the nut travels between axial positions without rotating about the axis of rotation of the reel. The locking member is restrained against axial displacement by a spring loaded detent mounted on the reel. Spring actuated means connect the traveling nut to the locking member so that as the nut travels a predetermined axial distance on threaded reel, it compresses a spring which produces an increasing axial force on the locking member. When the axial force increases to a magnitude sufficient to overcome the force of the detent, the locking member pops into or out of engagement with the inertia member.

Another preferred disabling means also employs a traveling nut mounted on a threaded reel and restrained against rotation so as the reel rotates the nut moves between axial positions. As the reel rotates in the unwind direction, the nut travels axially away from the locking member until it engages a pair of arms which withdraw the locking member away from the inertia member thereby permitting the retractor locking mechanism to assume an operative condition. A return spring mounted on the reel provides a connection between the nut and the locking member when the nut is traveling toward the locking member so that rotation of the reel in the wind direction moves the nut toward a position wherein it displaces the locking member into engagement with the inertia member rendering the retractor locking means inoperative.

Another embodiment of the invention, which is also responsive to a selected number of reel rotations from a reference position to axially move the locking member between engaged and disengaged positions with the inertia member takes the form of a scroll gear mounted on the end of the reel and defining a helical track which rotates about the reel axis. A flexible cable having one end connected to the locking member is actuated by a ball carried at the opposite end of the cable which rides in the helical track. The ball moves between radial positions corresponding to the number of revolutions the reel has rotated about its axis from an initial position associated with the fully retracted condition of the belt and pushes and pulls the locking member between operative axial positions. This form of the invention operates independently of the diameter of the belt roll and does not require an extension of the reel beyond that which is necessary for the displacement of the locking member.

It is therefore an object of the present invention to provide means for disabling an emergency locking retractor for vehicle safety seat belt systems.

It is another object of the present invention to provide means for disabling the locking means of an emergency locking seat belt retractor until a predetermined amount of belt has been withdrawn from the retractor.

It is still another object of the present invention to provide means for disabling the locking means of an emergency locking safety seat belt retractor when a predetermined amount of belt has been wound on the reel.

A still further object of the present invention is to provide means for disabling an emergency locking safety seat belt retractor until a predetermined amount of belt has been withdrawn from the retractor by the occupant with fail safe means arranged so that an occurrence rendering the disabling means inoperative leaves the emergency locking retractor in an operable condition.

Still another object of the present invention is to provide means for disabling the locking means of an inertia actuated automatic locking retractor until a selected amount of belt has been withdrawn from the retractor.

Another object of the present invention is to provide means for disabling the locking means of an emergency actuated safety seat belt retractor which is responsive to the effective diameter of the amount of belt wound on the retractor reel.

Another object of the present invention is to provide means for disabling an emergency actuated safety seat belt retractor until a predetermined amount of belt has been withdrawn from the retractor and which is responsive to the number of revolutions the reel has rotated from an initial position associated with the fully retracted position of the belt.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view of an emergency actuated locking retractor mounted adjacent a vehicle seat assembly and showing the end of the belt being withdrawn from a fully retracted position to a partially extended position by the occupant of the seat;

FIG. 2 is a perspective view of the retractor of FIG. 1 having the preferred disabling means for rendering the locking mechanism of the retractor inoperative;

FIG. 3 is an exploded view of the retractor of FIG. 1;

FIG. 4 is a view of the retractor locking means in its locked condition;

FIG. 5 is a view similar to FIG. 4 and showing the retractor locking means in the unlocked condition;

DESCRIPTION OF THE PREFERRED EMBODIMENTS

Figure 6:
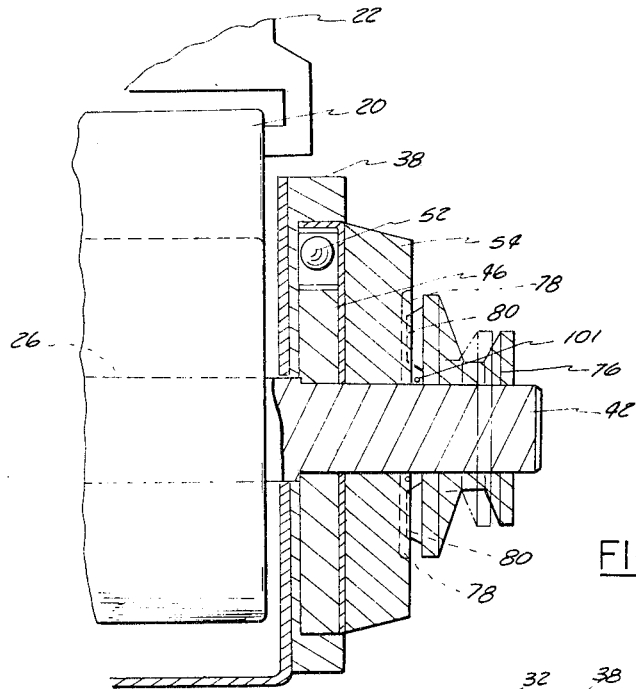
FIG. 6 is an enlarged longitudinal sectional view of the preferred inertia wheel locking member in a partially engaged position with the inertia wheel of the emergency locking retractor.

The description will be directed towards a specific emergency locking retractor and then toward a number of disabling means which are operative for rendering the particular emergency locking retractor inoperable until a predetermined amount of safety seat belt has been withdrawn from a stored position. It is to be understood, however, that the various embodiments of the disabling means can be adapted to act on other types of emergency locking retractors. Thus the locking means of the specific retractor described is responsive to an abnormal and accelerated belt movement from a stored position, however, the invention is equally applicable to other types of emergency retractors wherein the locking means are responsive to other conditions associated with the abnormal vehicular occurence such as an abnormal acceleration or deceleration of the vehicle.

Now referring to FIGS. 1 to 7, an emergency locking retractor 10 having disabling means 12 is mounted on the floor of a vehicle 14 adjacent a seat assembly 16. The retractor 10 and disabling means 12 are enclosed by a housing 18 having an aperture for withdrawing an elongated safety seat belt 20. The outer end of the belt 20 carries a coupling section 22 which is engageable with a complementary coupling section (not shown) by the occupant 24 of the seat assembly to provide a lap restraint. The retractor 10 is of the inertial locking type and comprises a reel 26 rotatably mounted to support means 28 which are fixed to the floor of vehicle 14. The reel 26 is rotatable about an axis transverse to the longitudinal movement of the belt 20.

The support means 28 includes a pair of flange sections 30 and 32 to which the reel 26 is journaled. The lower terminal end of the belt 20 is anchored to the reel by conventional means such as a stitched loop (not shown) which is received by a longitudinal slot 34 formed in the reel so that the belt is wound in a roll as the reel rotates.

A torsional spring 36 having an inner end attached to the reel 26 and an outer end fixed to the support flange 30 is pretensioned so that the reel is yielding biased in a wind direction. Thus when the occupant 24 uncouples the belt 20 from around his lap and releases it, the spring 36 retracts the belt within the housing 18. Under normal conditions with the belt embracing the occupant, the spring absorbs any slack in the belt as the occupant carries out various movements.

Preferably, the housing 18 has an aperture 38A which is smaller than the coupling section 22 so that when the belt is in its fully retracted condition, the coupling 22 remains exteriorly of the housing 18 to provide a handle for the occupant 24 to extend the belt.

The retracted 10 includes an annular ratchet member 38 which is fixedly mounted on the outer surface of the flange section 32. An annular series of substantially semicircular abutments 40 formed on the inner surface of the ratchet 38 are arranged symmetrically about the axis of rotation of the reel 26.

The outer end 42 of the reel has a pair of diametrically opposed flat sections 44 as can best be seen in FIG. 3. A cam wheel 46 having a bore 48 formed complementary to the outer section 42 of the shaft is mounted thereon so that it rotates with the shaft. The cam wheel has three spaced notches 50 formed on its peripheral surface, each having generally arcuate end sections. The notches 50 are rotated closely adjacent the locking abutments 40 of the ratchet 38.

A metal locking ball 52 is disposed in each of the notches 50. Each ball 52 has a dimension such that when it is in the outer end of its respective notch, it engages one of the abutments 40 of the ratchet 38. Assuming the reel is rotating in a clockwise direction as viewed in FIG. 4, the balls 52 provide an interference to the rotation of the cam wheel 46 and lock the reel 42 against rotation in the unwind direction.

Resilient inserts 51 which are disposed between the ends of the notches 50 control the movement of the balls 52 as they are displaced between the inner and outer ends of the notches. The inserts 51, preferably formed of a urethane provide a yielding cam surface for guiding the movement of the balls 52. The distance between the high point of each of the inserts 51 and the cusps of each of the ratchet abutments is less than the diameter of the balls 52. Thus the inserts initially yieldingly oppose the displacement of the balls from the inner ends of the notches to the outer ends as the balls move from their released position toward their locked position. The inserts 51 are depressed by the balls and then snap the balls into their locked position where they are trapped between the outer end of their respective notches and the ratchet.

When the balls 52 are disposed at the inner end of the notches 50, they are separated from the abutments 40 of the ratchet 38 and permit the cam wheel 46 and the reel 26 to rotate relative to the ratchet member 38.

An inertia wheel 54 has a circular bore 56 and is rotatably mounted on the reel 26. The inertia wheel 54 is yieldingly coupled to the cam wheel 46 by means of an axially directed finger 58 which is carried by the cam wheel 46 and has an outer spherical end registering in an arcuate slot 60 provided on the inner face of the inertia wheel 54. A drive spring member 62 disposed within the slot 60 has its inner end engaged with the spherical end of the finger 58 and its opposite end connected through a ball 64 to a set screw 66 engaged in a threaded bore 68 of the inerita wheel 54. Thus as can best be seen with reference to FIG. 3, as the cam wheel 46 rotates in a clockwise direction associated with the unwind direction of the reel 26, the outer end of the finger 58 drives the inertia wheel 54 through the spring 62.

The stiffness of the drive spring 62 is adjusted by set screw 66. The spring 62 is adjusted so that the inertia wheel 54 rotates in unison with the cam wheel 46 and the reel 26 rotates in the unwind direction under normal accelerations. However, when the reel 26 rotates at an abnormal acceleration associated with the occupant 24 suddenly being displaced by abnormal forces, the inertia wheel 54 tends to resist the driving force acting through the spring 62 from the finger 58.

Detent means comprising a ball 69A, acted on by a spring 69B, which is tensioned by a set screw 69C are carried by the inertia wheel with the ball normally seated in a depression 69D formed in the reel. Thus the spring 62 and the detent means resist the rotation of the inertia wheel relative to the cam wheel until the inertia of the inertia wheel has built up to a predetermined magnitude. The magnitude of the inertia necessary to produce this relative rotation can be varied by adjusting the stiffness of the spring 62 and the spring 69B. The detent means controls the amount of inertia necessary to initiate relative rotation between the inertia wheel and the cam wheel and the springs 62 and 69B cooperate to control the rate at which the inertia wheel and the cam wheel rotate relative to one another after the initial displacement has commenced. Thus it can be seen that the finger 58 and spring 62 provide a yieldable coupling between the cam wheel 46 and the inertia wheel 54 with the inertia wheel 54 normally rotating in unison with the cam wheel 46 but rotating relative to the cam wheel 46 when the reel 26 is rotated in the unwind direction at a predetermined rotational acceleration associated with an abnormal movement of the belt 20.

A plate 70 fixed to the inner face of the inertia wheel 54 and rotatable therewith has a pair of axially extending abutments 72 and 74 extending into each of the notches 50 of the cam wheel 46 and on opposite sides of the ball 52 of the associated notch. As best seen in FIGS. 4 and 5, as the inertia wheel 54 rotates counterclockwise relative to the cam wheel 46, the abutments 74 engage each of the locking balls 52 and move them to their locked position at the outer end of the notches 52 so that they engage the ratchet 38 and lock the reel against rotation. When the forces producing the predetermined rotational acceleration of the reel 26 have been reduced the spring 62 of the yieldable coupling returns the inertia member 54 to its normal orientation relative to the cam wheel 46 so that the abutments 72 engage the opposite side of the locking balls 52 and return them to the inner end of the notches 50 and their released position. The reel 26 can then freely rotate between its wind and unwind directions.

The inertia locking retractor 10, as described, has locking means responsive to an abnormal movement of the belt 20. Thus when the belt 20 is moved in its longitudinal direction at an abnormal rate, the locking means lock the reel 26 against rotation. As can be seen in FIG. 1, when the occupant 24 initially withdraws the belt 20 from its fully retracted position, the belt is not part of a body restraining system until it is coupled around the occupant 24, however, the occupant can withdraw the belt at a rate corresponding to what would be considered as an abnormal movement when the belt is part of the body restraining system and thereby cause the locking means to "prelock." The preferred disabling means and the other embodiments which will be subsequently described are intended to prevent this prelocking connection so that the occupant can withdraw a predetermined amount of the belt 20 from the retracting device 10 without any prelocks. In general the preferred disabling means take the form of means for preventing movement of the inertia wheel 54 relative to the reel 26 until a selected length of the belt 20 has been withdrawn from the reel 26.

Figure 7:
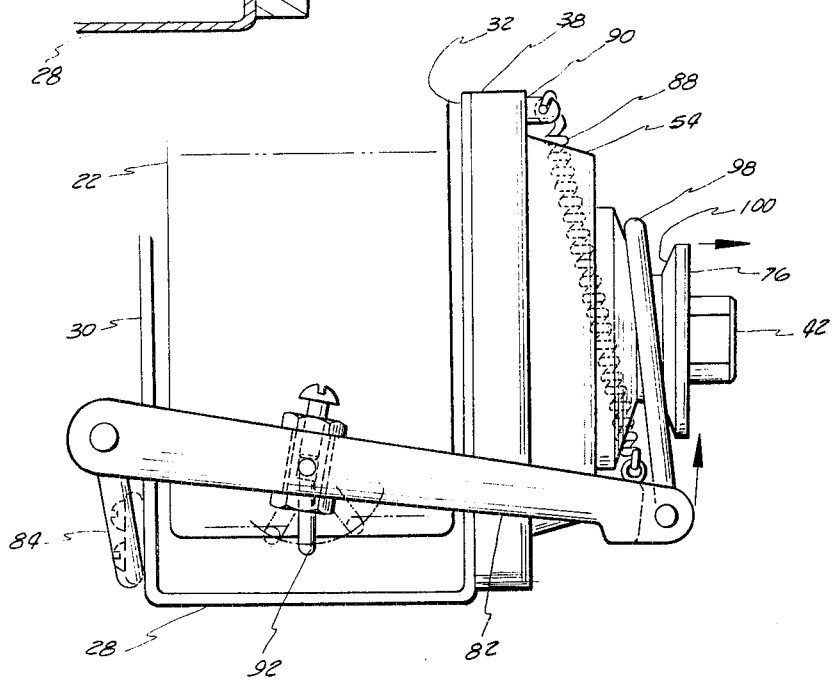
FIG. 7 is an enlarged view of the disabling arm showing the belt-sensing finger in selected positions.

The preferred disabling means 12 as best illustrated in FIGS. 2, 6 and 7, comprises a generally spool shaped locking member 76 which is mounted on the reel end 42 and axially slidable toward and away from the inertia wheel 54. The locking member 76 is keyed to the reel end 42 so that it rotates with the reel at all times. The inertia wheel 54 has four annularly spaced grooves 78 formed on its outer face which are engageable by four annularly spaced ridges 80 (FIG. 6) carried on the inner face of the locking member 76. As the locking member 76 approaches the inertia wheel 54, the ridges 80 engage the grooves 78 to provide cooperating abutments which lock the inertia wheel 54 against rotation relative to the reel 26.

An arm 82 pivotally connected to a support member 84 mounted to the flange 30 of the retractor support means 28 is movable between raised and lowered positions as can best be seen in FIG. 7. A cross bar 86 carried by the arm 82 is connected by a spring 88 to a support member 90 extending from the ratchet member 38. The spring 88 biases the arm 82 in an upward direction. A belt-sensing finger 92 carried at the midsection of the arm 82 has an outer end riding on the lower surface of the roll formed by the belt 20 which is wound on the reel 26. Thus the position of the arm 82 is determined by the effective diameter of the wound portion of the belt 20. As this diameter decreases due to the belt 20 being unwound from the reel 26, the arm 82 moves upwardly in response to the bias of the spring 88. Similarly, as the reel 26 rotates in the wind direction to wind the belt 20 into its stored, rolled configuration, the diameter of the roll increases thereby causing the arm 82 to move downwardly.

The belt-sensing finger 92 has an inner bent support end 94 engaged by a locking means 96 arranged so that the attitude of the finger 92 can be adjusted relative to the arm 82. Thus the particular orientation of the arm 82 associated with a selected amount of the belt 20 that has been withdrawn from the reel 26 can be precisely adjusted as a function of the roll diameter.

A stiff wire member 98 carried by the cross bar 86 has a U-shaped portion engaged with a spool shaped section 100 of the locking member 76. The wire member 98 is inclined with respect to the sidewalls of the spool shaped section 100 so that as the arm 82 moves between vertical positions, the wire 98 cams the locking member 76 between axial positions on the reel end 42. As can best be seen in FIG. 7, as the arm 82 moves upwardly in a direction associated with the reel rotating in an unwind direction, the locking member 76 is cammed away from the inertia wheel 54. Similarly, when the reel 26 is rotating in the wind direction so that the arm 82 is pivoted downwardly the wire member 98 acts against the inner shoulder of the spool portion 100 and cams the locking member 76 toward the locking reel 54 so that the ridges 80 of the locking member 76 approach and engage the grooves 78 of the inertia wheel 54.

The belt-sensing finger 92 is preferably adjusted so that the occupant 24 can withdraw approximately eighteen inches of the belt 20 before the locking member 76 disengages the inertia wheel 54 to permit the inertia wheel to rotate in response to the reel 26 rotating at an abnormal rotational acceleration. As the belt is retracted toward the retracting device 10 and its wound up condition, the locking member 76 approaches and engages the inertia wheel 54 when the diameter of the wound up belt 20 assumes a predetermined dimension.

A "fail safe" feature of the preferred disabling means 12 is that in the event an abnormal occurrence fractures or unseats the spring 88 providing the connection between the cross bar 86 and the support 90 so that the disabling means 12 becomes inoperative, the locking member 76 is automatically separated from the inertia wheel 54 so that the emergency locking retractor 10 is in an operative condition.

A spring 101 wrapped around the reel end 42 between the inertia wheel 54 and the locking member 76 provides an axial force biasing the locking member 76 away from the inertia member and assists in separating the locking member from the inertia wheel 54.

Figure 8:
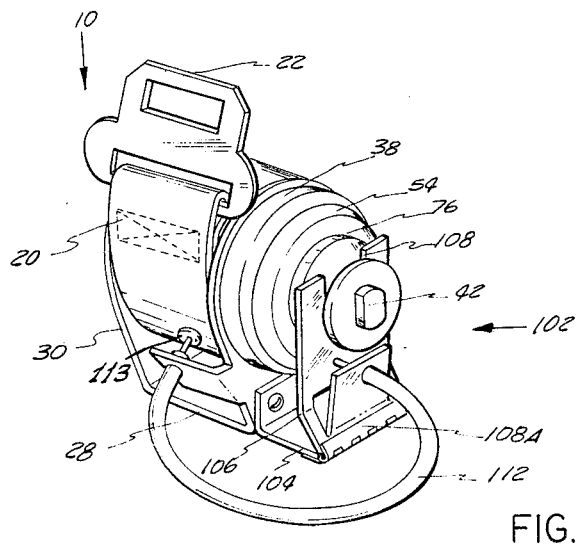
FIG. 8 is a perspective view of the emergency locking retractor with a disabling means illustrating another embodiment of the invention.
Figure 9:
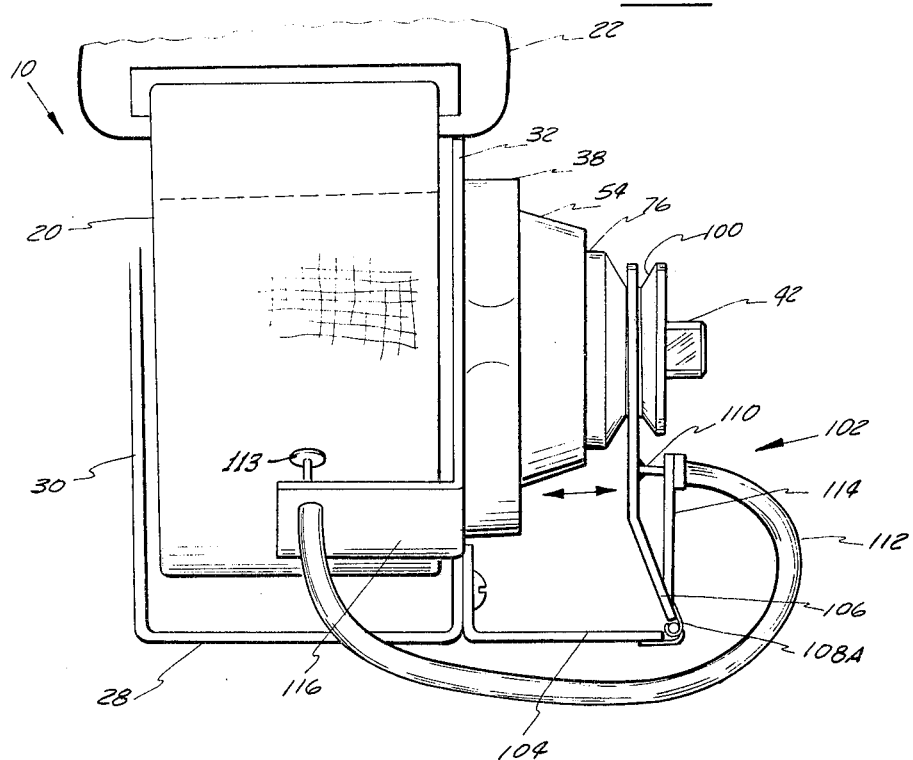
FIG. 9 is an enlarged elevational view of the disabling means and retractor of FIG. 8.

FIGS. 8 and 9 illustrate another preferred disabling means 102 arranged to disable the emergency locking retractor 10 and which is also dependent on the effective diameter of the wound up belt 20 to render the retractor locking means ineffective. In this form of the invention, an L-shaped frame 104 attached to the flange 32 supports a hinge member 106 having a U-shaped portion 108 engaged with a spool shaped portion 100 of the locking member 76.

As the hinge member 106 pivots about its hinge axis, it displaces the locking member 76 between axial positions relative to the inertia wheel 54. A coil spring 108A acts to bias the hinge member 106 toward the inertia wheel 54. An elongated flexible cable 110 slidably mounted within a casing 112 has an inner end fixed to the hinge member 106 and an opposite belt-sensing end 113 riding on the wound up belt 20. The inner end of the casing 112 is mounted to a support 116 depending from flange 32 and arranged so that the belt-sensing end 113 of the cable moves between radial positions associated with the changing diameter of the wound up belt 20. Thus it can be seen that the position of the locking member 76 is dependent on the effective diameter of the wound up belt 20 with the displacement of the locking member 76 being produced by the flexible cable 110.

Figure 10:
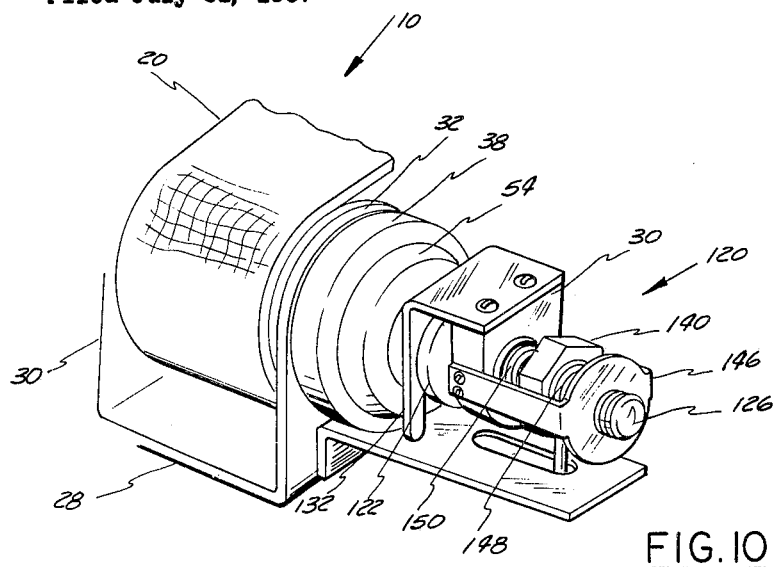
FIG. 10 is a perspective view of the emergency locking retractor with a disabling means illustrating still another embodiment of the invention.
Figure 11:
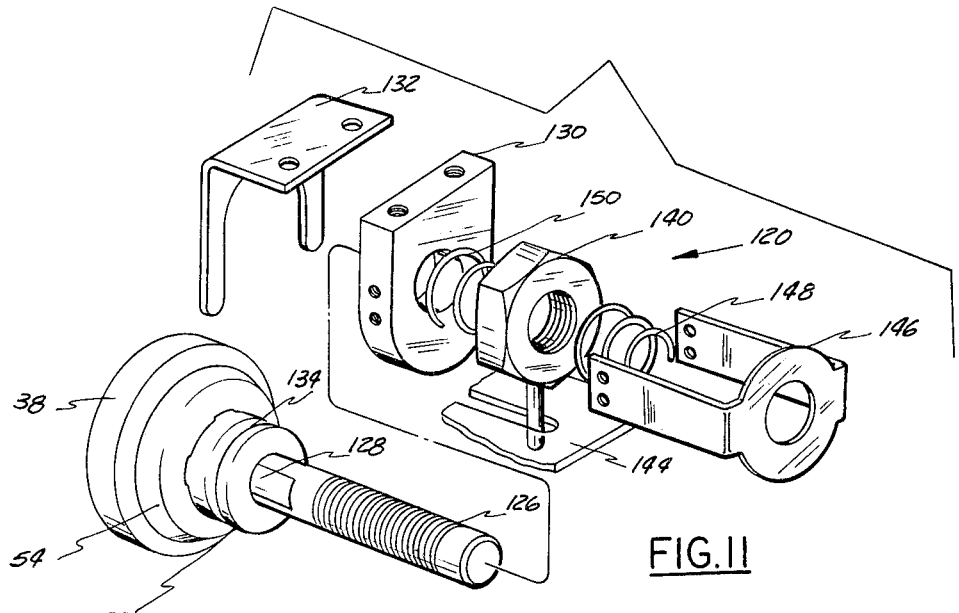
FIG. 11 is an exploded view showing the disabling means of FIG. 10.
Figure 12:
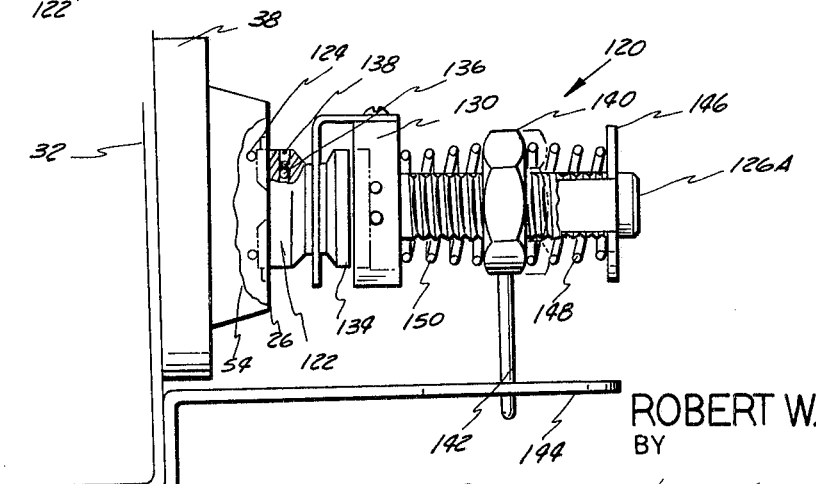
FIG. 12 is an elevational view of the disabling means of FIG. 10 and showing the traveling nut in axially spaced positions.

FIGS. 10, 11 and 12 illustrate another embodiment of the invention which takes the form of disabling means 120 arranged to axially displace a locking member between positions wherein it engages and disengages the inertia wheel 54.

This form of the invention employs a locking member 122 which is similar to locking member 76 in that it is axially displaceable toward and away from the inertia wheel 54 and has ridges 124 engageable with grooves 126 formed on the outer face of the inertia wheel 54, the ridges 124 and grooves 126 cooperating to lock the inertia wheel 54 against rotation as the locking member 122 approaches the inertia wheel.

The emergency locking retractor 10 has an elongated threaded end 126–A, has a pair of flats 128 (only one of reel 26.

The locking member 122 is axially displaceable on the threaded end 126–A has a pair of flats 128 (only one of which is shown) which prevent the locking member 122 from rotating relative to the reel. An actuator member 130 carried a fork 132 engaged with a spool shaped portion 134 of the locking member 122. Thus the actuator member 130 and the locking member 122 are axially movable as a unit.

The reel 126 is bored to receive a spring loaded detent 136 which engages a hole 138 in the member 122 and restricts axial movement of the locking member 122. The detent 136 is adjusted so that the locking member 122 will not disengage the inertia wheel 54 until a predetermined axial force is acting outwardly on the locking member 124.

A traveling nut 140 is mounted on the threaded end 126–A and carries a downwardly depending pin 142 engaged in a slotted bracket 144 which prevents the nut 140 from rotating. Thus as the reel 26 is rotated, the threaded end 126–A causes the nut 140 to move between axially spaced positions.

A second actuator member 146 connected to the actuator member 130 extends outwardly of the traveling nut 140 and provides means for retaining a spring member 148 which acts between the nut 140 and the actuator 146 to urge the actuator 130 outwardly. A second spring 150 is arranged between the nut and the actuator 130 and functions as a return spring as the nut moves in a direction approaching the inertia member 54.

In operation, the nut 140 moves away from the inertia wheel 54 as the end of the belt is withdrawn to the retractor until a predetermined length of the belt has been withdrawn from the retractor. As the nut 140 travels away from the inertia wheel, it compresses the spring 148 to produce an axial force on the actuator member 146. As this axial force on the actuator 146 increases, the actuator 146 in turn produces an axial force on the inertia wheel acting against the retaining force of the detent 136. The locking member 122 pops away from the inertial wheel so that it can rotate relative to the reel 26 when an abnormal pulling force is applied on the belt 20.

When the reel 26 is rotating in the wind direction, the nut 140 travels toward the inertia wheel 54 and compresses the spring 150 which in turn applies an axial force on the actuator 130 and the fork 134. This axial force causes the locking member 122 to engage the inertia wheel 54 when the reel 26 has rotated in the wind direction until only the predetermined length of belt remains extended from the reel. Thus it can be seen that the engagement and disengagement of the locking member 122 is a function of the number of revolutions of the reel about its axis of rotation relative to a reference point associated with the fully retracted position of the belt.

Figure 13:
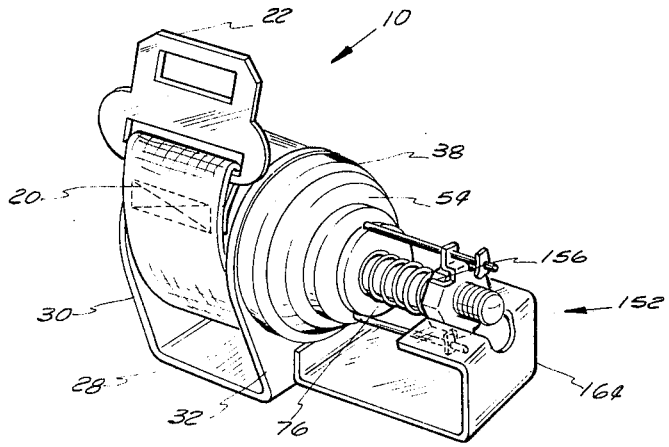
FIG. 13 is a perspective view of the emergency locking retractor with disabling means illustrating a still further embodiment of the invention.
Figure 14:
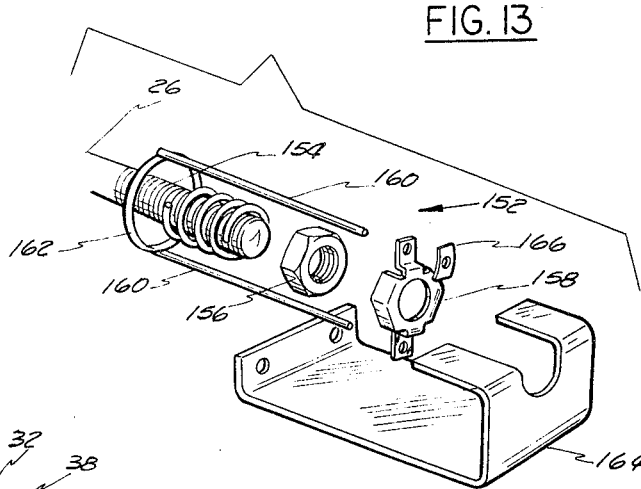
FIG. 14 is an exploded view of the disabling means of FIG. 13.
Figure 15:
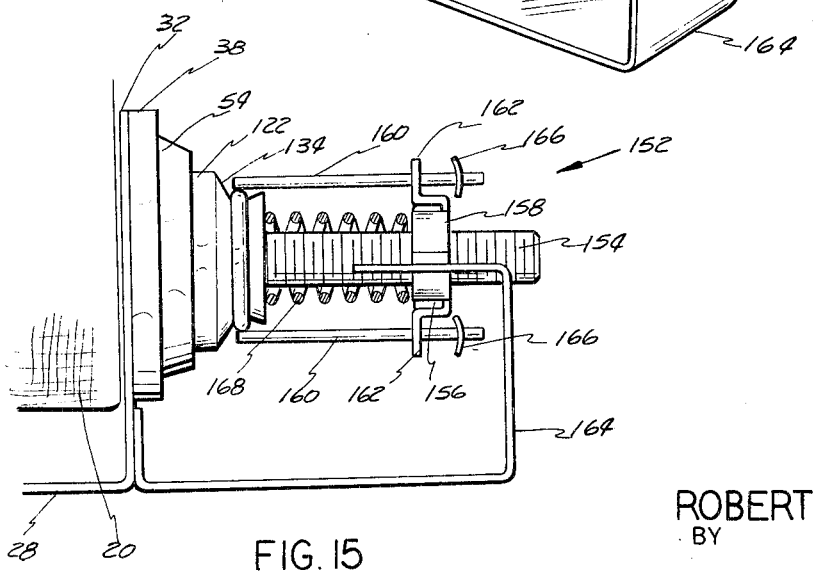
FIG. 15 is an elevational view of the disabling means of FIG. 14.

Another form of preferred disabling means 152 for controlling the clocking mechanism of the emergency locking retractor 10 is illustrated in FIGS. 13, 14 and 15 and also employs the locking member 122 having a spool shaped section 134 to lock the inertia member 54 against relative rotation with respect to the reel 26. Disabling means 152 also employs a threaded extension 154 of the reel 26. A traveling nut 156 is mounted on the threaded extension 154 and is displaced axially as the reel rotates in opposite directions.

An actuator 158 is engaged by the nut 156 as it moves outwardly and prevents the nut 156 from rotating. The actuator 158 is slidably mounted on a pair of laterally extending guide rods 160 which are connected at their inner ends by a ring member 162 mounted on the shoulder 134 of the locking member 122. Thus as the guide rods 160 move outwardly they pull the locking member 122. When the belt has been rewound with the exception inertia wheel 54. The actuator 158 has ear portions 162 which are slidably mounted on the pins 160 and an intermediate portion engaged by a bracket 164 which is fixed to the support means 28 and prevents the actuator 158 from rotating.

A pair of stop members 166 are mounted near the outer end of each of the guide rods 160 and engage the ears 162 of the actuator as the nut travels outwardly to a position associated with the predetermined length of belt 20 having been withdrawn from the retractor 10. Further outward travel of the nut 156 disengages the locking member 122 from the inertia wheel 54. Similarly, as the nut 156 approaches the inertia wheel 54 due to the reel rotating in the wind direction, the nut compresses a spring 168 disposed between the nut and the locking member 122. When the bolt has been rewound with the exception of the predetermined extended length, the spring 168 produces a sufficient axial force to urge the locking member 122 into engagement with the inertia wheel 54 to prevent the inertia wheel 54 from rotating relative to the shaft in the manner similar to the embodiments hereintofore described.

Figure 16:
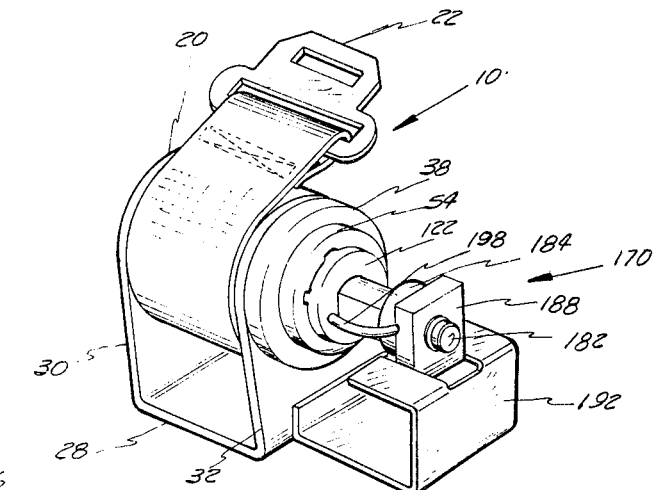
FIG. 16 is a perspective view of the emergency locking retractor with scroll gear disabling means.
Figure 17:
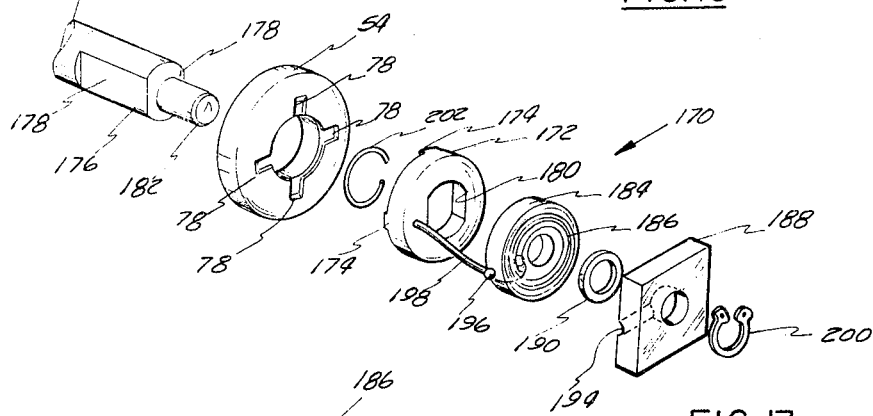
FIG. 17 is an exploded view of the disabling means of FIG. 16.
Figure 18:
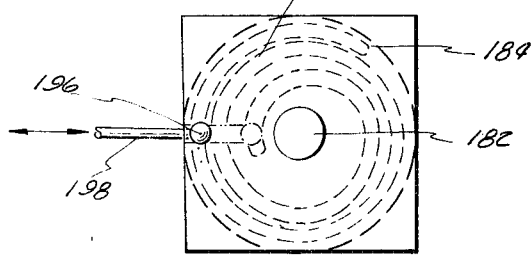
FIG. 18 is a transverse sectional view of the scroll gear and showing the radial positions of the actuating ball and cable.

FIGS. 16, 17 and 18 illustrate disabling means 170 which is also responsive to the reel 26 rotating a predetermined number of revolutions from the fully retracted position of the belt 20 to move a locking member 172 into and out of engagement with the inertia member 54. The locking member 172 has ridges 174 for engaging the grooves 78 of the inertia member to prevent relative rotation between the inertia member and the reel 26 when less than a predetermined amount of the belt 20 have been withdrawn from the retractor 10.

The outer end 176 of the reel 26 has a pair of flats 178 for engaging the bore 180 of the locking member 172 so that the locking member is axially movable with respect to the reel 26 but cannot rotate relative to the reel 26. The extreme end 182 of the reel 26 is narrowed with a circular cross section. An actuator member 184 is keyed to the end 182 and has a spiral track 186 formed on its outer face. A second actuator member 188 is rotatably mounted on the end 182 of the reel and spaced from the actuator member 184 by an annular spacer 190. The actuator member 188 is locked against rotation with respect to the reel 26 by a bracket 192 which is mounted to the support means 28. The actuator 188 has a linear track 194 with a generally semicircular cross section extending from the outer edge of the actuator 194 and radially inwardly toward the reel. Similarly, the spiral track 186 has a substantially semicircular cross section in its longitudinal direction.

A ball 196 carried on the end of an actuating cable 198 is disposed between the actuators 184 and 188 and seated in both the spiral track 186 and the linear track 194. The outer end of the cable is attached to the locking member 172.

In operation, as the reel 26 rotates, the spiral track 186 of the actuator 184 cooperates with the linear track 194 to cause the ball to move radially toward and away from the narrowed end 182 of the reel which in turn axially displaces the locking member 172 into and out of engagement with the inertia wheel 54. As the reel 26 rotates in the unwind direction, the ball 196 travels radially inwardly on the spiral track 186 to shorten effective length of the cable 198 which pulls the locking member 172 axially outwardly and away from the inertia wheel 54 thereby freeing the inertia wheel 54 so that it can rotate relative to the reel in response to the inertia forces. When the reel 26 rotates in the wind direction, the ball 196 travels radially outwardly thereby lengthening the effective length of the cable 198 and pushes the locking member 172 axially toward the inertia member 154 until the ridges 174 engage the grooves 78 and lock the inertia member 54 against rotation relative to the reel 26. A retainer 200 retains the actuator 184 and 188 on the narrow end 182 of the reel.

A spring 202 disposed between the locking member 172 and the inertia member 154 assists in urging the locking member 172 toward its disengaged position as the effective length of the cable 198 shortens by the reel rotating in the unwind direction.

I claim:

1. In a body restraining system for controlling the movement of a body within a vehicle, the combination comprising: a reel support means mounted on said vehicle; a reel rotatably mounted on said support means for rotation in wind and unwind directions; an elongated belt having one end adapted for coupling to the body and its other end connected to the reel; resilient means coupled to said reel for rotating said reel in the wind direction to wind up said belt, said resilient means being normally yieldable in response to a force applied on said belt in a direction away from said reel to allow rotation of said reel in the unwind direction; stop means normally responsive to an abnormal acceleration of said belt in a direction away from said reel for restraining rotation of said reel in the unwind direction; and disabling means for rendering said stop means inoperative until a predetermined amount of said belt has been unwound from said reel.

2. The combination as defined in claim 1, wherein said stop means includes a rotatably mounted inertia member, means for yieldably coupling said inertia member to said reel so that said inertia member rotates with said reel when said reel is rotating in the unwind direction at less than a predetermined rotational acceleration, said coupling means yielding when said reel rotates at said predetermined rotational acceleration and said stop means being responsive to the yielding of said coupling means to stop rotation of said reel in the unwind direction.

3. The combination as defined in claim 1, wherein said stop means includes a rotatably mounted inertia member; means for yieldably coupling said inertia member to said reel so that said inertia member rotates in unison with said reel when said reel is rotating in the unwind direction at less than a predetermined rotational acceleration, and relative to said reel when said reel is rotating in the unwind direction at said predetermined rotational acceleration, and said stop means being responsive to the relative rotation between said reel and said inertia member to stop rotation of said reel in the unwind direction so that said belt applies a restraining force on said body.

4. The combination as defined in claim 1, wherein said stop means includes a rotatably mounted inertia member, means for coupling said inertia member to said reel so that said inertia member rotates in unison with said reel when said reel is rotating in the unwind direction at less than a predetermined rotational acceleration, and said inertia member rotates relative to said reel when said reel is rotating in the unwind direction at said predetermined rotational acceleration, said stop means being responsive to the relative rotation between said reel and said inertia member to stop rotation of said reel in the unwind direction and said disabling means prevents said inertia member from rotating relative to said reel when said reel is rotating at said predetermined rotational acceleration in the unwind direction when less than said predetermined amount of belt is unwound from said reel.

5. The combination as defined in claim 1, wherein said stop means includes a rotatably mounted inertia member, means for yieldably coupling said inertia member to said reel so that said inertia member rotates with said reel when said reel is rotating in the unwind direction at less than a predetermined rotational acceleration, said coupling means yielding when said reel rotates at said predetermined rotational acceleration, said stop means being responsive to the yielding of said coupling means to stop rotation of said reel in the unwind direction, and said disabling means prevents said yielding means from yielding when said reel is rotating at said predetermined rotational acceleration and less than said predetermined amount of belt is unwound from said reel.

6. The combination as defined in claim 1, wherein said stop means are operative to stop rotation of said reel when less than said predetermined amount of belt has been unwound from said reel and said disabling means are inoperative.

7. The combination as defined in claim 1, wherein said disabling means are responsive to the effective diameter of said belt wound on said reel.

8. The combination as defined in claim 1, wherein said disabling means are responsive to said reel being rotated a predetermined number of revolutions about its axis of rotation from a reference position.

9. The combination as defined in claim 1, wherein said disabling means are operable to render said stop means inoperative until a selected amount of said belt has been unwound from said reel.

10. The combination as defined in claim 1, wherein said stop means includes an actuating member displaceable between first and second positions in response to the rotational acceleration of said reel increasing from a rate less than said predetermined rotational acceleration to said predetermined rotational acceleration, and said disabling means includes a locking member engageable with said actuating member for preventing the displacement of said actuating member from said first position until said predetermined amount of belt has been unwound from said reel.

11. The combination as defined in claim 1, wherein said stop means includes an inertia member having first abutments and mounted on said reel to rotate in unison with said reel when said reel is rotating in the unwind direction at less than a predetermined rotational acceleration and to rotate relative to said reel when said reel is rotating in the unwind direction at said predetermined rotational acceleration, said stop means being responsive to the relative rotation between said inertia member and said reel to stop rotation of said reel in the unwind direction; said locking member being mounted on said reel and fixed against rotation relative to said reel, said locking member having second abutments and being axially displaceable between a first position wherein said first and second abutments are engaged to prevent said inertia member from rotating relative to said reel and a second position wherein said first and second abutments are disengaged.

12. The combination as defined in claim 11, wherein said disabling means includes means for sensing the diameter of said belt wound on said reel, and motion transmitting means connecting said sensing means and said locking member and operative to displace said locking member to said first position when the diameter of the belt wound on said reel is greater than a predetermined diameter.

13. The combination as defined in claim 12, wherein said reel is supported for rotation about a generally horizontal axis and said disabling means includes an arm pivotably mounted for movement between raised and lower positions, resilient means urging said arm upwardly, a finger carried by said arm, said finger riding on the belt wound on said reel to move said arm downwardly as the diameter of the belt wound on said reel increases, and a collar member carried by said arm and engaged with said locking member, said collar member being arranged to displace said locking member when the diameter of the belt wound on said reel increases to said predetermined diameter.

14. The combination as defined in claim 13, wherein said finger is mounted for movement between selected vertical positions on said arm so that the diameter of the belt wound on said reel necessary to move said locking member to said first position can be selectively varied.

15. The combination as defined in claim 11, wherein said disabling means includes an elongated threaded section rotatable with said reel, a nut rotatably mounted on said threaded section, means preventing said nut from being rotated with respect to the support means, such that rotation of said threaded section produces displacement of said nut in a first axial direction when said reel is rotating in the wind direction and in the reverse axial direction when said reel is rotating in the unwind direction, and means connecting said nut to said locking member to produce coacting axial displacement of said nut and said locking member.

16. The combination as defined in claim 11, including an elongated threaded section rotatable about its axis and with said reel, a nut rotatably mounted on said threaded section, means preventing said nut from rotating with respect to the support means so that rotation of said threaded section produces axial displacement of said nut in a first axial direction when said reel is rotating in the wind direction and in the reverse axial direction when said reel is rotating in the unwind direction, resilient means connecting said nut and said locking member so that axial movement of said nut produces an axial force on said locking member, and yieldable detent means acting on said locking member to resist axial displacement of said locking member when said axial force is less than a predetermined axial force and to allow axial displacement when said axial force increases to said predetermined axial force.

17. The combination as defined in claim 11, including a movable member engaged with said locking member to produce coacting axial displacement thereof, means biasing said movable member in a first axial direction, and an elongated flexible cable having one end fixed to said movable member and an opposite end riding on the roll of said belt wound on said reel, said opposite end being movable between radial positions relative to the axis of rotation of said reel, the radial movement of said opposite end producing axial movement of said movable member so that the axial position of said locking member is determined by the diameter of said roll.

18. The combination as defined in claim 11, wherein said disabling means includes a scroll gear mounted on said reel and rotatable therewith, said scroll gear having a helical track extending radially from the axis of rotation of said reel, an elongated flexible cable having one end connected to said locking member to produce axial displacement thereof, and its opposite end engaged in the helical track of said scroll gear so that the rotation of said reel is operative to produce axial displacement of said locking member.

19. In a body restraining system for controlling the movement of a body within a vehicle, the combination comprising: reel means mounted for rotation in wind and unwind directions; an elongated belt having one end adapted for coupling to the body and its other end connected to the reel means; resilient means coupled to said reel means for rotating said reel means in the wind direction to wind up said belt, said resilient means being normally yieldable in response to a force applied on said belt in a direction away from said reel to permit rotation of said reel in the unwind direction; stop means normally responsive to said reel means rotating in the unwind direction due to forces producing an abnormal displacement of said body, said stop means being operative to stop rotation of said reel in the unwind direction to restrain the abnormal displacement of the body within the vehicle, and disabling means for rendering said stop means inoperative when a predetermined amount of belt has been wound on said reel means.

20. The combination as defined in claim 19, wherein said stop means are operative to stop rotation of said reel when more than said predetermined amount of belt has been wound on said reel, and said disabling means are inoperable.

21. In a body restraining system for controlling the movement of a body within a vehicle, the combination comprising:
(a) reel means mounted on said vehicle for rotation in wind and unwind directions;
(b) an elongated belt having one end adapted for coupling to the body for the application of restraining forces and an opposite end attached to said reel;
(c) resilient means coupled to said reel for rotating said reel in the wind direction to take up slack in said belt; and
(d) stop means operative when a predetermined amount of said belt has been unwound from said reel to restrain rotation of said reel in the unwind direction in response to an abnormal acceleration of said belt in a direction away from said reel, said stop means normally permitting said reel to rotate in the unwind direction when said predetermined amount of said belt has been unwound from said reel.

22. A seat belt system comprising:
(a) a support;
(b) a reel journaled on the support for rotation in a first direction and the opposite, second direction;
(c) bias means for urging the reel toward rotation in its first direction;
(d) a safety seat belt connected to said reel so as to be movable toward a first position, as the reel is rotated in its first direction, in which the belt is wound on the reel, or toward a second position, as the reel is rotated in its second direction, in which the belt is unwound from the reel;
(e) stop means supported for motion between a locked position in which it is operative to prevent motion of the belt toward its second position, and an unlocked position in which it is inoperative to prevent motion of the belt toward its second position;
(f) a first member, on the support, having a spiral track; and
(g) a second member connected with the spiral track so as to be moved, as the reel is rotated, between a first position with respect to the track in which it is operable to prevent the stop means from being moved from its unlocked position toward its locked position, and a second position in which it is inoperable to prevent motion of the stop means toward its locked position.

23. A seat belt system as defined in claim 22, in which the stop means includes a locking member which is movable toward engagement with the reel when the second member is in its second position, and is restrained against motion toward engagement with the reel when the second member is in its first position.

24. A seat belt system as defined in claim 22, in which the first member is mounted on the support such that the spiral track is rotated about the axis of rotation of the reel as the reel is rotated; and including a follower member engaged in said track so as to be moved with respect to the track in directions toward and away from the axis of rotation of the reel as the reel is rotated, said follower member being connected with the second member to move the second member as the reel is rotated.

25. In a safety seat belt system, the combination comprising:
 (a) a support;
 (b) a reel journaled on the support for rotation in a wind direction, and in the opposite, unwind direction;
 (c) an elongated seat belt connected to the reel to be extended as the reel is rotated in the unwind direction, and to be retracted toward a fully retracted position as the reel is rotated in the wind direction;
 (d) a bias member connected to the reel to urge it toward its wind direction;
 (e) locking means operable when actuated to lock said belt against further extension and including a locking member mounted on the support so as to be movable between a locking position in which it is operable to stop rotation of the reel in its unwind direction and a release position in which it is inoperable to stop reel rotation; and
 (f) disabling means normally operable to prevent said locking means from locking said belt and including a member connected with said reel and movable upon rotation of said reel from a position rendering said locking means inoperable to a position permitting operation of said locking means.

References Cited
UNITED STATES PATENTS

| | | | |
|---|---|---|---|
| 3,058,687 | 10/1962 | Bentley | 242—107.4 |
| 3,193,327 | 7/1965 | Roe | 297—388 |
| 3,244,382 | 4/1966 | Blake | 242—107.4 |
| 3,286,946 | 11/1966 | Board et al. | 242—107.2 |
| 3,369,768 | 2/1968 | Burns | 242—107.4 |
| 3,369,769 | 2/1968 | Burns | 242—107.4 |
| 3,389,874 | 6/1968 | Van Noord | 242—107.2 |

STANLEY N. GILREATH, Primary Examiner

W. H. SCHROEDER, Assistant Examiner